(12) United States Patent
Horikoshi

(10) Patent No.: US 7,471,938 B2
(45) Date of Patent: Dec. 30, 2008

(54) POWER CLIPPING CIRCUIT AND POWER CLIPPING METHOD

(75) Inventor: Shuhei Horikoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 11/387,960

(22) Filed: Mar. 24, 2006

(65) Prior Publication Data
US 2006/0227906 A1   Oct. 12, 2006

(30) Foreign Application Priority Data
Mar. 25, 2005   (JP) .............................. 2005-089595

(51) Int. Cl.
*H04B 1/04* (2006.01)
(52) U.S. Cl. ..................... 455/212; 455/232.1; 455/296
(58) Field of Classification Search ........................ None
See application file for complete search history.

(56) References Cited

U.S. PATENT DOCUMENTS 4,893,349 A * 1/1990 Eastmond et al. ........... 455/205
2007/0087705 A1 * 4/2007 Teramoto .................... 455/116

FOREIGN PATENT DOCUMENTS

| JP | 2004-32450 A | 1/2004 |
| JP | 2004-349941 A | 12/2004 |

\* cited by examiner

*Primary Examiner*—Thanh C Le
(74) *Attorney, Agent, or Firm*—Sughrue Mion, PLLC

(57) ABSTRACT

A power clipping circuit and method of the clipping circuit is provided. A power clipping circuit comprises, a selector which receives a baseband signal, and selects one of the baseband signal or a feed back signal, and outputs a selected signal, and a square clipping circuit which receives the selected signal, and limits an amplitude of the selected signal, and outputs a clipped signal, and a phase rotation circuit which receives the clipped signal, and rotates a phase of the clipped signal, and outputs a phase rotated signal to the selector as the feed back signal, and an amplitude scaling circuit which receives the phase rotated signal, and adjust the phase rotated signal to compensate an amplitude difference between the phase rotated signal and the clipped signal, and sends amplitude scaled signal, and a controlling circuit which controls the selector, the square clipping circuit, the phase rotation circuit and the amplitude scaling circuit.

15 Claims, 6 Drawing Sheets

US 7,471,938 B2

POWER CLIPPING CIRCUIT AND POWER CLIPPING METHOD

CROSS-REFERENCE TO RELATED PATENT APPLICATION

This application claims the benefit of Japanese Patent Application No. 089595/2005, filed on Mar. 25, 2005, in the Japanese Patent Office, the disclosure of which is incorporated herein in its entirety by reference.

BACKGROUND OF THE INVENTION

The present invention relates to a power clipping circuit used in a baseband signal unit in a base station and the like using a W-CDMA (Wideband-Code Division Multiple Access) radio communications system. In a case of radio transmission apparatuses, including mobile phones, of a radio communication system, it is considered beneficial for a power amplifier used in a linear digital modulation circuit to have excellent linearity and high efficiency characteristics with regard to an amplitude of a transmitted signal. However, using a power amplifier with excellent linearity for every transmitted signal has disadvantages such as an accompanying increase in a circuit size, cost, power consumption and the like. For this reason, the amplifier which is typically used in the field is as follows. Although power amplifiers actually in use can maintain the linearity to a certain level, the power amplifiers can not maintain the linearity beyond the certain level, and therefore, can output nonlinear signals.

In a case where a communications method in which a plurality of transmission carriers are multiplexed together, such as CDMA (Code Division Multiple Access) and OFDM (Orthogonal Frequency Division Multiplex), post-multiplexed signals have large peak power. As a result of an amplification of signals with that large peak power by using a nonlinear power amplifier, nonlinear distortion occurs. This causes out-band radiation to occur. Thus, inter-channel interference deteriorates modulation precision. As a result, an error-ratio characteristic is deteriorated.

With this taken into consideration, a clipping circuit for suppressing peak powers respectively of common-mode signals (I) and orthogonal signals (Q) in a baseband signal unit has been proposed as a method of avoiding occurrence of nonlinear output signals in a power amplifier (for example, Japanese Patent Laid-open Patent No. 2004-032450, Japanese Patent Laid-open Patent No. 2004-349941). Typical examples of the clipping circuit are square clipping and circle clipping.

The square clipping process can be realized in a circuit with a very small size. However, the square clipping process applies the clipping process separately to an I signal and a Q signal. For this reason, in a case where one of the two signals does not exceed a clip level, the clipping process is applied to the other signal only. Accordingly, phase errors occur respectively in the I signal and the Q signal. These phase errors deteriorate modulation precision in their respective modulated waves and error-ratio characteristics as well.

On the other hand, in the case of the circle clipping process, the clipping process is applied to both the I signal and the Q signal along their respective phases. For this reason, the circle clipping process brings about an advantage that the phase error, which is a problem with the square clipping process, does not occur in the circle clipping process. However, the circle clipping process increases amounts of arithmetic process, data-read process and the like in conjunction with increase in the number of bits of each of the I and Q signals. Accordingly, this enlarges the circuit size, and increases power consumption.

In addition, the polygon clipping process has been known besides the square clipping process and the circle clipping process. FIG. 1 is a block diagram showing a configuration of a conventional hexadecagon clipping circuit. This hexadecagon clipping circuit is configured of a square clipping circuit 301, a phase rotation circuit 302, a square clipping circuit 303, a phase rotation circuit 304, a square clipping circuit 305, a phase rotation circuit 306, a square clipping circuit 307, a phase rotation circuit 308, and a amplitude scaling circuit 309. The square clipping circuit 301 applies a square clipping process to each of received I and Q signals with a clip level RL. The phase rotation circuit 302 rotates the phases respectively of the I and Q signals, to which the square clipping process has been applied by the square clipping circuit 301, by $+\pi/4$. The square clipping circuit 303 applies a square clipping process to the I and Q signals, whose phases have been rotated by $+\pi/4$, with a clip level $RL \times (2)^{1/2}$. The phase rotation circuit 304 rotates the phases respectively of the I and Q signals, to which the clipping process has been applied by the square clipping circuit 303, by $-\pi/8$. The square clipping circuit 305 applies a square clipping process to the I and Q signals, whose phases have been rotated by $-\pi/8$, with a clip level $RL \times 2 \times \{2-(2)^{1/2}\}^{1/2}$. The phase rotation circuit 306 rotates the phases respectively of the I and Q signals, to which the clipping process has been applied by the square clipping circuit 305, by $-\pi/4$. The square clipping circuit 307 applies a square clipping process to the I and Q signals, whose phases have been rotated by $-\pi/4$, with a clip level $RL \times 2 \times (2)^{1/2} \times \{2-(2)^{1/2}\}^{1/2}$. The phase rotation circuit 308 rotates the phases respectively of the I and Q signals, to which the clipping process has been applied by the square clipping circuit 307, by $+\pi/8$. The amplitude scaling circuit 309 adjusts the amplitudes respectively of the I and Q signals whose phases have been rotated by $+\pi/8$, and outputs the resultant signals.

As described above, the conventional square clipping process has a problem in that the phase errors occur respectively in the I and Q signals.

In addition, the circle clipping process has a problem in that the circuit size is enlarged and power consumption is increased.

Furthermore, in the case of the polygon clipping process, a plurality of basic circuit modules each constituted of square clipping circuits and phase rotation circuits need to be connected to one another in series. For this reason, the polygon clipping process has a disadvantage in that the circuit size is large. In particular, each of triacontakaidigon clipping and hexacontakaitetragon clipping needs a large number of basic circuits. Accordingly, increase in circuit size is more significant.

SUMMARY OF THE INVENTION

The present invention has been made for the purpose of solving the aforementioned problems. An object of the present invention is to provide a power clipping circuit which makes it possible to avoid the occurrence of phase errors which are a problem with the square clipping process, and to concurrently reduce the circuit size.

One aspect of the present invention is a power clipping circuit which has a selector which receives a baseband signal, and selects one of the baseband signal or a feed back signal, and outputs a selected signal, and which has a square clipping circuit which receives the selected signal, and limits an amplitude of the selected signal, and outputs a clipped signal, and which has a phase rotation circuit which receives the clipped signal, and rotates a phase of the clipped signal, and outputs a phase rotated signal to the selector as the feed back signal, and which has an amplitude scaling circuit which receives the phase rotated signal, and adjusts the phase rotated signal to compensate for an amplitude difference between the phase rotated signal and the clipped signal, and sends amplitude scaled signal, and which has a controlling circuit which controls the selector, the square clipping circuit, the phase rotation circuit and the amplitude scaling circuit.

Another aspect of the present invention is a power clipping method which selects one of a baseband signal and a feed back signal, clips an amplitude of the selected signal, rotates a phase of the clipped signal, adjusts the phase rotated signal to compensate for an amplitude difference between the phase rotated signal and the clipped signal, repeats from the selecting, the clipping and the rotating in a predetermined time.

In the case of the present invention, the power clipping circuit is provided with the first selection circuit, the square clipping circuit, the phase rotation circuit, the amplitude scaling circuit and the control circuit. The power clipping circuit is designed to cause the first selection circuit to perform selecting operations, cause the square clipping circuit to perform the clipping process, cause the phase rotation circuit to perform the phase rotation, and cause the control circuit to switch the clip levels and control signals, N/4 times for each cycle of the received baseband signals. Accordingly, this makes it possible to realize the polygon clipping process with a smaller circuit in size than any conventional circuit. For this reason, use of the power clipping circuit according to the present invention makes it possible to suppress, for example, distortion of the output signals with a relatively small circuit size. Such distortion of the output signals occurs when a peak power signal caused by a CDMA signal which is obtained by multiplexing a plurality of channels together is inputted to a power amplifier in a transmission device. In addition, the realization of the polygon clipping process makes it possible to avoid the occurrence of the phase errors which are a problem with the square clipping process. Moreover, in the case of the present invention, it is possible to easily realize various clipping processes ranging from a square clipping process to a quasi-circle clipping process, depending on situations and on intended use, without changing the circuit configuration by changing the clip level and control signal which are outputted from the control circuit as well as the numbers of feedbacks which are performed for each cycle of the received baseband signals makes.

As well, in the case of the present invention, provision of the timing adjustment circuit, the comparison circuit and the second selection circuit makes it possible to avoid applying the polygon clipping process to the received baseband signals at a lower level which need no power control.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Figure 1:
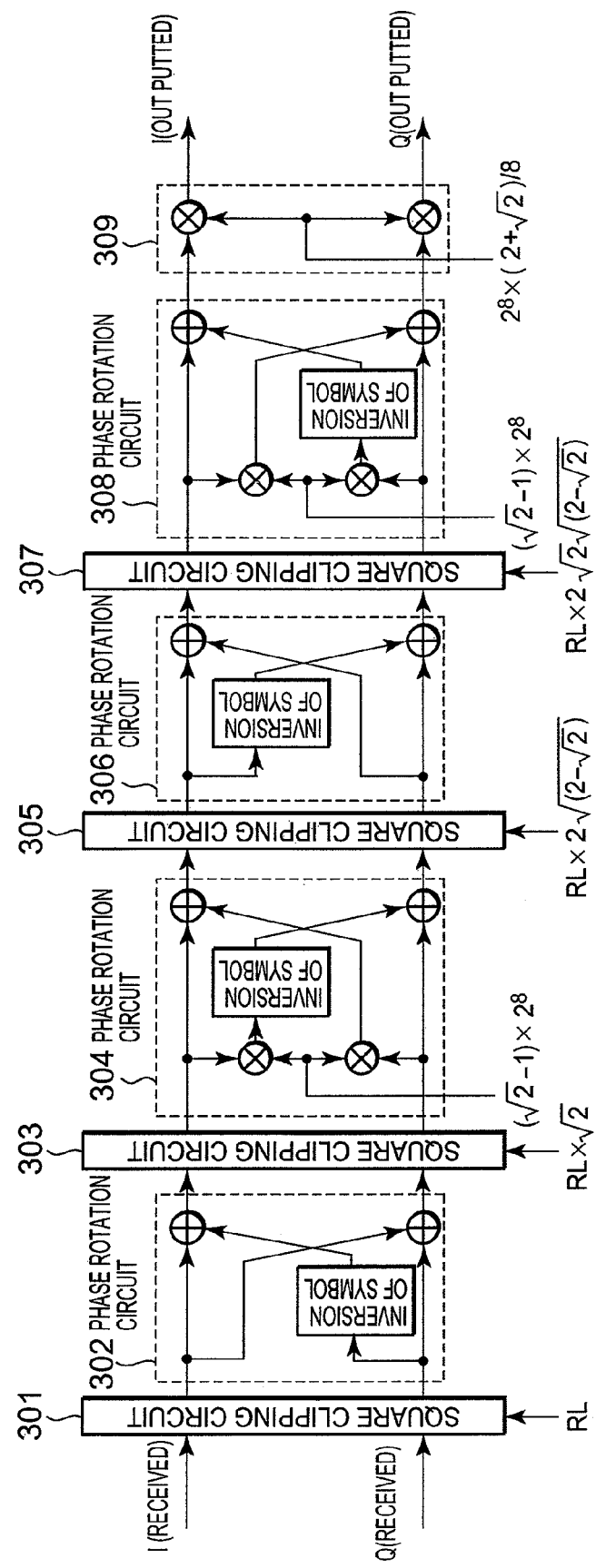
FIG. 1 is a block diagram showing a configuration of a conventional hexadecagon clipping circuit.

Hereinafter, exemplary embodiments of the present invention will now be described in detail with reference to the accompanying drawings. The described exemplary embodiments are intended to assist in understanding the invention, and are not intended to limit the scope of the invention in any way.

In the case of the power clipping circuit according to the present invention, each of an I signal (common-mode signal) and a Q signal (orthogonal signal) of baseband signals are inputted to a polygon clipping circuit. The polygon clipping circuit is configured of a square clipping circuit, a phase rotation circuit and an amplitude scaling circuit. In the polygon clipping circuit, the I and Q signals, which are the received signals, are inputted to the square clipping circuit, and are processed by the square clipping process. The I and Q signals, on which the square clipping circuit has performed the square clipping process, are inputted to the phase rotation circuit. The I and Q signals whose phases have been rotated are fed back, and are inputted to the square clipping circuit once again. In addition, the amplitudes respectively of the signals thus fed back are larger than the original amplitudes respectively of the control circuit due to the rotation of their phases. For this reason, with the enlargement taken into consideration, control is made for the purpose of correcting the clip level in the square clipping circuit, which is obtained by the feedback, from the outside.

A selector is used for choosing which of the received I and Q signals and the feedback signals should be inputted to the square clipping circuit. In the case of the hexadecagon clipping process, I and Q signals which are obtained by the first square clipping process are fed back after the phases of the signals are rotated by $+\pi/4$. With regard to the second square clipping process, the I and Q signals are processed by a square clipping process in a square clipping circuit with a clip level different from that of the first square clipping process, and thereafter the phases respectively of the I and Q signals are rotated by $-\pi/8$. The phases are rotated by $-\pi/4$ in the third square clipping process, and by $+\pi/8$ in the fourth square clipping process. In this manner, the phases are returned to the original phases. This makes it possible to realize the hexadecagon clipping process. The octagon clipping process requires two feedbacks. The triacontakaidigon clipping process requires 8 feedbacks. As a result, the N-gon clipping process ($N=2^{(n+2)}$: n=0, 1, 2, ... ) requires N/4 feedbacks for each cycle of the I and Q signals.

Due to the phase rotation performed by this feedback circuit, the values on the amplitudes obtained by the polygon clipping circuit are larger than the values on the original amplitudes. For this reason, the values on the amplitudes obtained by the polygon clipping circuit are corrected by the amplitude circuit so that the values of the amplitudes can be equal to the values on the original amplitudes. The signals which have been adjusted by the amplitude scaling circuit become signals which are going to be outputted from the polygon clipping circuit.

A conventional hexadecagon clipping circuit as shown in FIG. 1 requires four square clipping circuits and four phase rotation circuits. If the triacontakidigon clipping circuit and the hexacontakaitetragon clipping circuit are intended to be realized, this brings about a problem that these circuits enlarge their circuit sizes further. The present invention brings about an advantage in that only one square clipping circuit and one phase rotation circuit are sufficient for the polygon clipping circuit to be realized.

Figure 2:
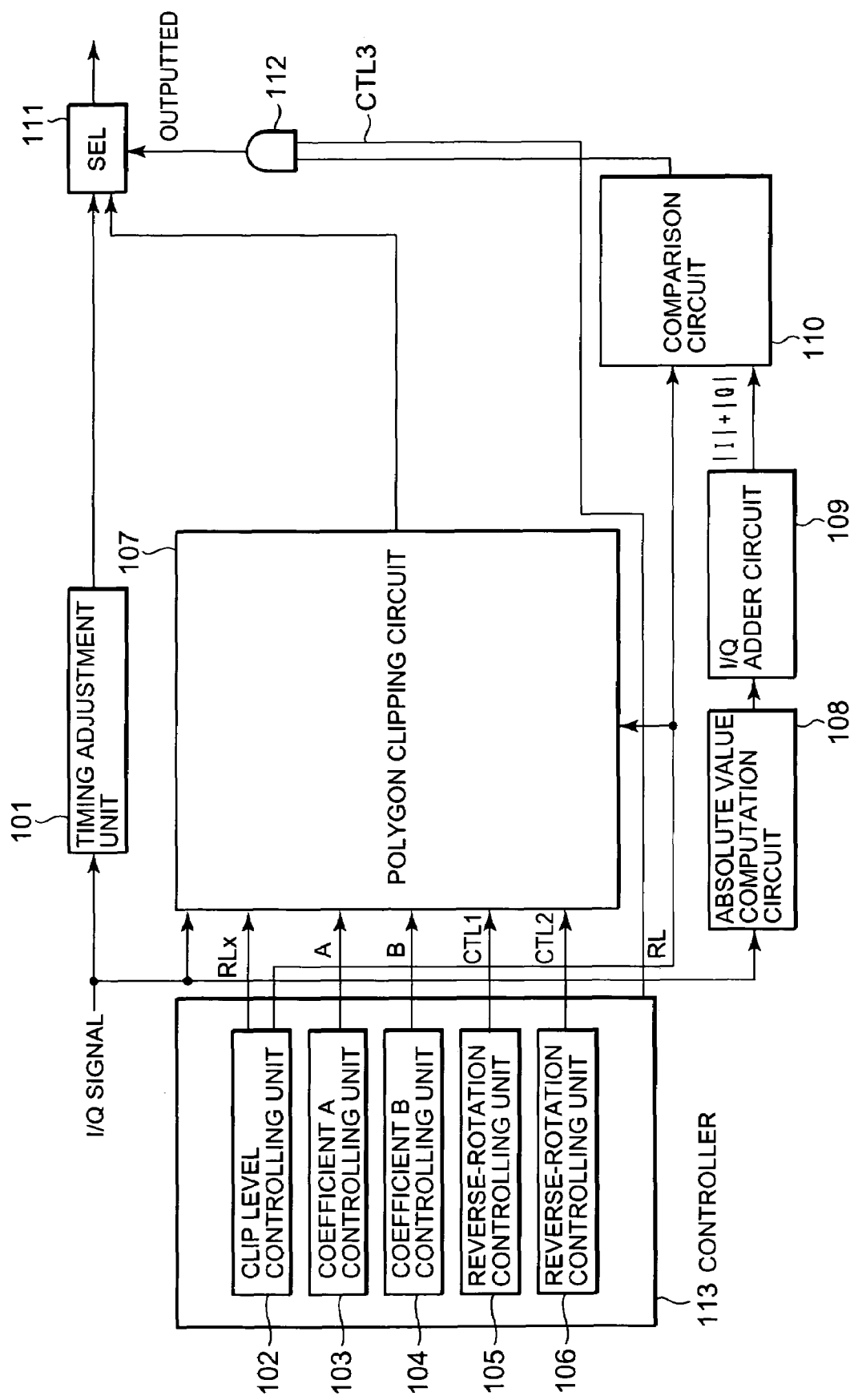
FIG. 2 is a block diagram showing a configuration of a power clipping circuit according to an exemplary embodiment of the present invention.

Hereinafter, descriptions will be provided for an exemplary embodiment of the present invention with reference to the drawings. FIG. 2 is a block diagram showing a configuration of a power clipping circuit according to the exemplary embodiment of the present invention. The power clipping circuit according to this exemplary embodiment is configured of a polygon clipping circuit 107, a clip level controlling unit 102, a coefficient A controlling unit 103, a coefficient B controlling unit 104, a first reverse-rotation controlling unit 105, a second reverse-rotation controlling unit 106, a timing adjustment unit 101, an absolute value computation circuit 108, an I/Q adder circuit 109, a comparison circuit 110, a selector (hereinafter abbreviated to "SEL") 111 serving as a second selection circuit, and a logical multiplication circuit (hereinafter referred to as "AND") 112. The controller 113 includes the clip level controlling unit 102, the coefficient A controlling unit 103, the coefficient B controlling unit 104, the reverse-rotation controlling unit 105 and the reverse-rotation controlling unit 106. The clip levels RL and RLx are output from the clip level controlling unit 102 in the controller 113.

In the case of this exemplary embodiment, received signals are I and Q signals which have been processed by a baseband signal process. The I and Q signals which have been processed by a baseband signal process are inputted to the polygon clipping circuit 107, the timing adjustment circuit 101, and the absolute value computation circuit 108.

Control signals from the clip level controlling unit 102, the coefficient A controlling unit 103, the coefficient B controlling unit 104, the first reverse-rotation controlling unit 105 and the second reverse-rotation controlling unit 106 are inputted to the polygon clipping circuit 107 in conjunction with these circuits' operations. These control signals depend on each polygonal type. For this reason, setup values of these control signals are written beforehand into a RAM, which is not illustrated here. Then, the setup values thus written are read out, and are inputted to the polygon clipping circuit 107.

Figure 3:
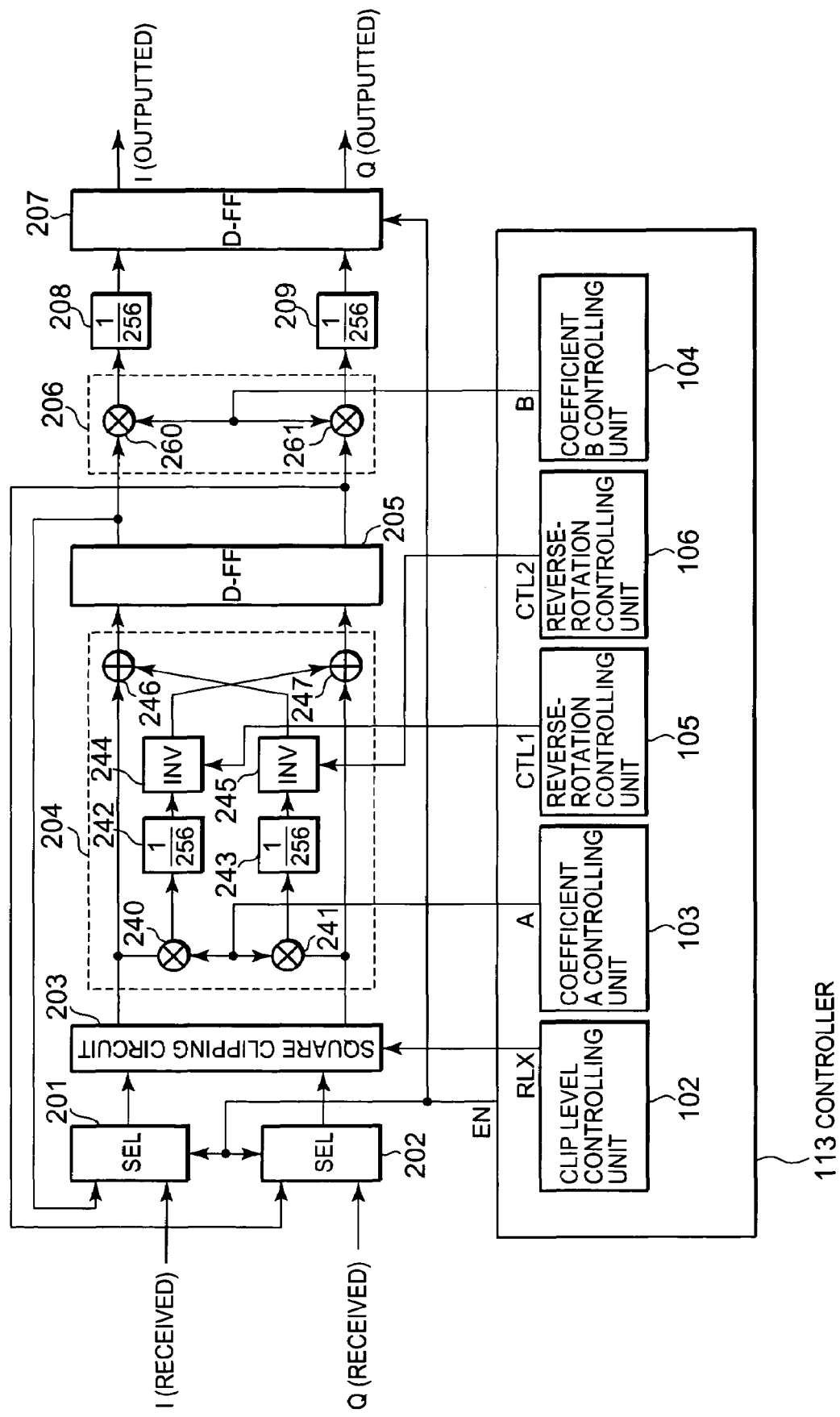
FIG. 3 is a block diagram showing a configuration of a polygon clipping circuit in the power clipping circuit according to the exemplary embodiment of the present invention.
Figure 4:
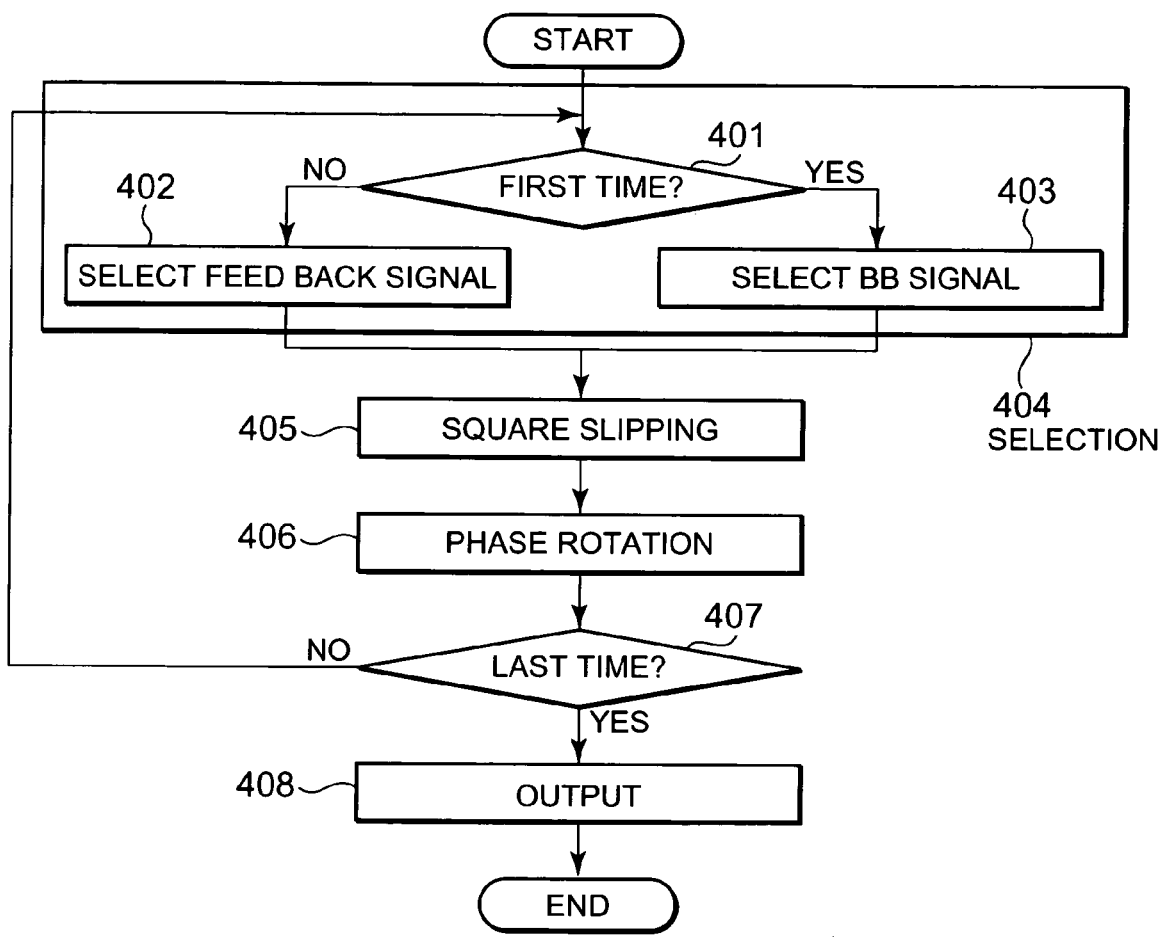
FIG. 4 is a flow diagram showing a flow of the operation of the power clipping circuit according to the exemplary embodiment of the present invention.

FIG. 3 shows a configuration of the polygon clipping circuit 107 according to this exemplary embodiment. The polygon clipping circuit 107 is configured of SELs 201 and 202 serving as first selection circuits, a polygon clipping circuit 203, a phase rotation circuit 204, D flip-flop circuits (hereinafter abbreviated to "D-FF") 205 and 207, an amplitude scaling circuit 206, and amplitude reduction units 208 and 209.

The phase rotation circuit 204 is constituted of a multiplier 240, a multiplier 241, amplitude reduction units 242 and 243, inverter units 244 and 245, an adder 246, and an adder 247. The multiplier 240 multiplies the I signal, which has been outputted from the square clipping circuit 203, by a coefficient A. The multiplier 241 multiplies the Q signal, which has been outputted from the square clipping circuit 203, by a coefficient A. The amplitude reduction units 242 and 243, respectively, reduce the amplitudes of signals outputted from the adders 240 and 241 by a ratio of 1/256. The inverter units 244 and 245 inverse or do not inverse signals outputted from the amplitude reduction units 242 and 243, respectively, and output the resultant signals. The adder 246 adds the I signal outputted from the square clipping circuit 203 and the signal outputted from the inverter 245. The adder 247 adds the Q signal outputted from the square clipping circuit 203 and the signal outputted from the inverter unit 244.

In addition, the amplitude scaling circuit 206 is configured of multipliers 260 and 261 which multiply respectively, the I and Q signals outputted from the D-FF 205 by a coefficient B.

The SELs 201 and 202 choose between the received I and Q signals and signals fed back from the D-FF 205 in the previous stage, and output the selected signals. The selecting operations by the SELs 201 and 202 are performed in synchronism with a control signal EN. The control signal has the same cycle as the received I and Q signals. In a case where the control signal is, for example, at an "H" level, the SELs 201 and 202 select the I and Q signals. In a case where the control signal is, for example; at an "L" level, the SELs 201 and 202 select the signals fed back from the D-FF 205.

The square clipping circuit 203 applies a square clipping process to the I and Q signals, which have been outputted from the SELs 201 and 202, with a clip level RLx. Since this exemplary embodiment has been described using the case of the hexadecagon clipping, the number of feedbacks from the D-FF 205 is four times for each cycle of the I and Q signals. As a result, the clip level controlling unit 102 outputs a clip level RLx, which is obtained by switching the clip levels four times, to the square clipping circuit 203.

A clip level RL1 obtained by the first switch is expressed by RL, and a clip level RL2 obtained by the second switch is expressed by $RL \times (2)^{1/2}$. A clip level RL3 obtained by the third switch is expressed by $RL \times 2 \times \{2-(2)^{1/2}\}^{1/2}$, a clip level RL4 obtained by the fourth switch is expressed by $RL \times 2 \times (2)^{1/2} \times \{2-(2)^{1/2}\}^{1/2}$. The clip levels are switched in synchronism with a clock signal CLK, which is not illustrated. The clock signal CLK is synchronized with the control signal EN, and has four times as large a frequency as the received I and Q signals. In a case of an N-gon clipping process, the frequency of the clock signal CLK may be set N/4 times as large as that of the I and Q signals.

Subsequently, the phase rotation circuit 204 rotates the respective phases of the I and Q signals, which the square clipping circuit 203 has performed the first clipping process, by $+\pi/4$. The D-FF 205 fetches the I and Q signals, whose phases have been rotated by $+\pi/4$, in synchronism with the following clock signal CLK, and feeds back the I and Q signals, respectively, to the SELs 201 and 202.

The SELs 201 and 202 select, and output, the signals fed back from the D-FF 205. In the case of the second square clipping process performed by the square clipping circuit 203, in order to clip signals whose amplitudes have become larger than the original amplitude of the signals due to the phase rotation circuit 204, the clip level RLx is switched to the clip level RL2, which is larger than the first click level RL1. As described above, the second clip level RL2 is in the order of $(2)^{1/2}$ times as large as the first clip level RL1.

The phase rotation circuit 204 rotates the respective phases of the I and Q signals, which the square clipping circuit 203 has performed the second clipping process, by $-\pi/8$. The D-FF 205 fetches the I and Q signals, whose phases have been rotated by $-\pi/8$, in synchronism with the following clock signal CLK, and feeds back the I and Q signals, respectively, to the SELs 201 and 202. In the third square clipping performed by the square clipping circuit 203, the clip level RLx is switched to the clip level RL3.

Subsequently, the phase rotation circuit 204 rotates the respective phases of the I and Q signals, which the square clipping circuit 203 has performed the third clipping process, by $-\pi/4$. The D-FF 205 fetches the I and Q signals, whose phases have been rotated by $-\pi/4$, in synchronism with the following clock signal CLK, and feeds back the I and Q signals respectively to the SELs 201 and 202. In the fourth square clipping performed by the square clipping circuit 203, the clip level RLx is switched to the clip level RL4.

Thereafter, the phase rotation circuit 204 rotates the respective phases of the I and Q signals, which the square clipping circuit 203 has performed the fourth clipping process, by $+\pi/8$. The D-FF 205 fetches the I and Q signals, whose phases have been rotated by $+\pi/8$, in synchronism with the following clock signal CLK.

In this manner, the phase rotation circuit 204 rotates the phases of the I and Q signals, which the square clipping circuit 203 have performed clipping process, by $+\pi/4$, $-\pi/8$, $-\pi/4$, and $+\pi/8$ in this sequence. For this reason, the coefficient A controlling unit 103 switches coefficients A in synchronism with the clock signal CLK, the first reverse rotation controlling unit 105 switches the control signals CTL1 in synchronism with the clock signal CLK, and the second reverse rotation controlling unit 106 switches the control signals CTL2 in synchronism with the clock signal CLK.

In the first rotation process, the coefficient A is $1.0 \times 2^8$, the control signal CTL1 is zero (normal rotation), and the control signal CTL2 is one (reverse rotation). In the second rotation process, the coefficient A is $\{(2)^{1/2}-1\} \times 2^8$, the control signal CTL1 is one (reverse rotation), and the control signal CTL2 is zero (normal rotation). In the third rotation process, the coefficient A is $1.0 \times 2^8$, the control signal CTL1 is one (reverse rotation), and the control signal CTL2 is zero (normal rotation). In the fourth rotation process, the coefficient A is $\{(2)^{1/2}-1\} \times 2^8$, the control signal CTL1 is zero (normal rotation), and the control signal CTL2 is one (reverse rotation).

The inverter unit 244 in the phase rotation circuit 204 outputs a signal, which has been received from the amplitude reduction unit 242, as it is, when the control signal CTL1 is zero. When the control signal CTL1 is one, the inverter unit 244 inverses the received signal, and outputs the resultant signal. Similarly, the inverter unit 245 outputs a signal, which has been received from the amplitude reduction unit 243, as it is, when the control signal CTL2 is zero. When the control signal CTL2 is one, the inverter unit 245 inverses the received signal, and outputs the resultant signal.

The phases respectively of the I and Q signals, which have been processed by the fourth square clipping process and phase rotation process, returns to the phases respectively of the original signals. However, the values on the amplitudes become larger. For this reason, the resultant amplitudes are returned to the original amplitudes by use of the amplitude scaling circuit 206 and the amplitude reduction units 208 and 209. The multipliers 260 and 261 in the amplitude scaling circuit 206 multiply the respective I and Q signals, which have been outputted from the D-FF 205, respectively by the coefficient B. The coefficient B outputted from the coefficient B controlling unit 104 is $\{RL^4 \times /(RL1 \times RL2 \times RL3 \times RL4)\} \times 2^8$. The amplitude reduction units 208 and 209 reduce the respective amplitudes of the I and Q signals, which have been outputted from the amplitude scaling circuit 206, with a ratio of 1/256. The D-FF 207 fetches the I and Q signals, which have been outputted from the amplitude reduction units 208 and 209, in synchronism with the control signal EN.

On the other hand, the absolute value computation circuit 108 computes the respective absolute values of the received I and Q signals. The I/Q adder 109 adds the absolute value |I| of the I signal to the absolute value |Q| of the Q signal. The comparison circuit 110 compares a signal |I|+|Q| outputted from the I/Q adder 109 with the clip level RL in terms of magnitude, and outputs a result of the comparison. In a case where, as a result of the comparison, the signal amplitude is not larger than the clip level RL, a signal outputted from the timing adjustment circuit 101 is selected by the SEL 111 with a configuration of two inputs vs. one output. Moreover, in a case where the signal amplitude is larger than the clip level RL, a signal outputted from the polygon clipping circuit 107 is selected. As well, the logical multiplication of an instruction signal CTL3 from the controller 113 and a comparison result signal from the comparison circuit 110 is calculated by the AND 112 in order that the polygon clipping process can be turned on and off from the outside. Thus, the result of this logical multiplication is used as a control signal for the SEL 111.

Hereinafter, the operation of the power clipping circuit according to this exemplary embodiment of the invention will be provided. FIG. 3 shows the operation of the power clipping circuit. The cycle which comprises Operations 404, 405, 406 and 407 is repeated for N/4 times when the polygon clipping circuit 107 works as an N-gon clipping circuit.

First, the polygon clipping circuit 107 selects one of the baseband signal and a feed back signal from the D-FF 205 (Operation 404). Specifically, the SEL 201 selects one of an I signal and a feed back signal, and the SEL 202 selects one of a Q signal and a feed back signal. This selection operation is performed based on a control signal EN which comes from a controller 113. The operation of the SELs 201 and 202 is synchronized.

In operation 404, the controller 113 checks whether or not this cycle is the first time of the N/4 times (Operation 401). In the case of the first time, the SELs 201 and 202 select the baseband signal (Operation 403). At the other times, the SELs 201 and 202 select a feed back signal from the phase rotation circuit 204 (Operation 402).

Then, the square clipping circuit 203 clips an amplitude of the input signal from the SELs 201 and 202 (Operation 405). The amount of the clipping is determined in response to an amount of changing in an amplitude by the next rotation operation. This amount may be pre-calculated and stored in the controller 113. The square clipping circuit 203 sends the clipped signal to the phase rotation circuit 204.

The phase rotation circuit 204 rotates the received signal from the square clipping circuit 203 (Operation 406). The amount of the phase rotation may be based on what number this cycle is, as described below. The phase rotation circuit 204 sends the rotated signal to D-FF 205. The phase rotated signal is fed back to the SELs 201 and 202 as described in FIG. 3. Until the last cycle of N/4 cycles, operations 404 through Operation 407 are repeated. If the cycle of the series of operations is the last time (N/4 time), the phase rotated signal is output to the SEL 111 from the D-FF 207 (Operation 408).

Figure 5:
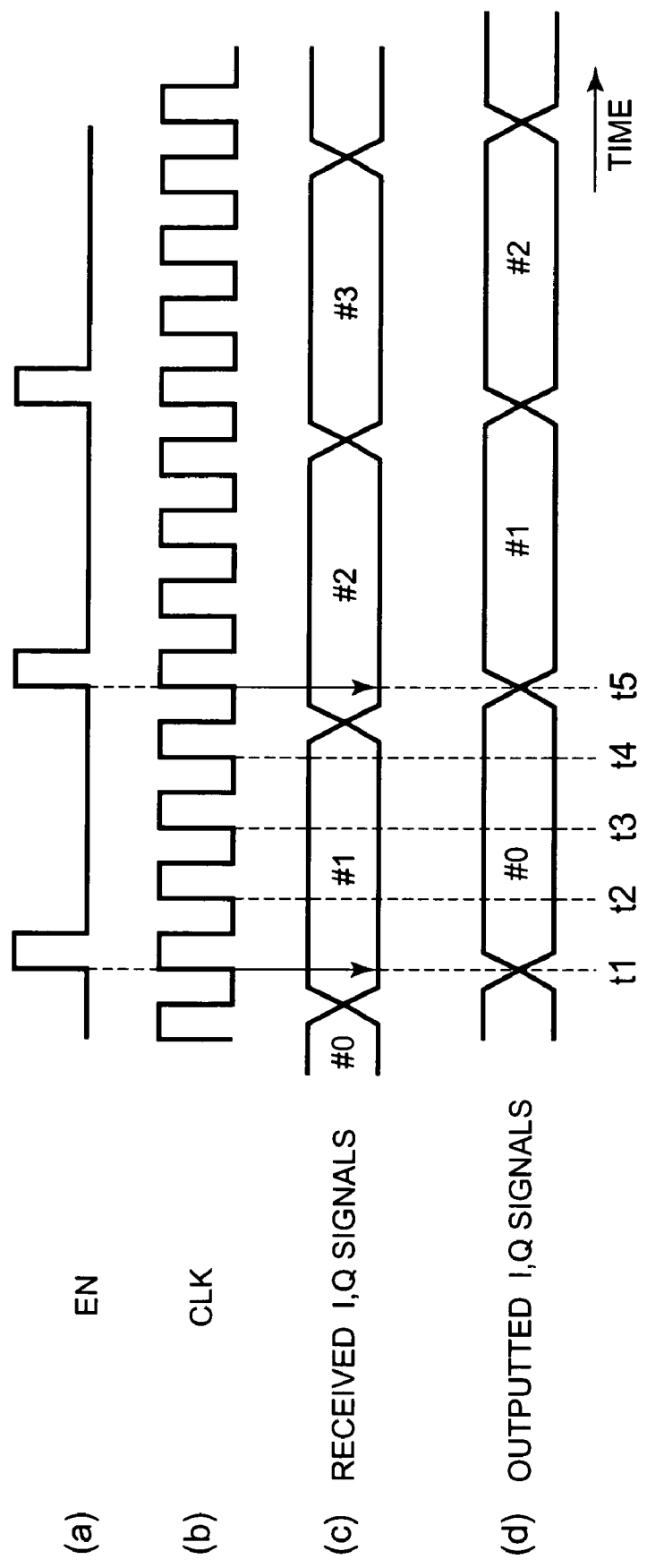
FIG. 5 is a timing chart showing operations of the power clipping circuit according to the exemplary embodiment of the present invention.

Hereinafter, detailed descriptions will be provided for operations of the power clipping circuit according to this exemplary embodiment. FIG. 5 is a timing chart showing operations of the power clipping circuit according to this exemplary embodiment.

First, the I and Q signals, which have been processed by the baseband signal process, is inputted to the polygon clipping circuit 107. The polygon clipping circuit 107 can cope with various polygon clipping processes by use of signals respectively from the clip level controlling unit 102, the coefficient A controlling unit 103, the coefficient B controlling 104, the first reverse rotation controlling unit 105, and the second reverse rotation controlling unit 106.

The number of times that an output value from each of the clip level controlling unit 102, the coefficient A controlling unit 103, the first reverse rotation controlling unit 105 and the second reverse rotation controlling unit 106 is switched varies depending on types of the polygon clipping processes. In the case of the octagon clipping process, each output value is switched twice for each cycle of the I and Q signals. In the case of the hexadecagon clipping process, each output value is switched four times for each cycle of the I and Q signals. In the case of the triacontakaidigon clipping process, each output value is switched eight times for each cycle of the I and Q signals. The switching processes of each output value and the reading process from the polygon clipping circuit 107 have to be synchronized with the timing of the feedback in the polygon clipping circuit 107. For this reason, the switching and the read are performed in synchronism with the clock signal CLK as shown in FIG. 5(b).

Descriptions will be provided for detailed operations of the polygon clipping circuit 107 with reference to FIGS. 3 and 5. The received I and Q signals as shown in FIG. 5(c) which have been processed by the baseband signal process, are inputted to the respective SELs 201 and 202 in the polygon clipping circuit 107 respectively. The SELs 201 and 202 select, and output, the received I and Q signals (denoted by #1 of FIG. 5(3)) at a time t1 when the control signal EN as shown in FIG. 5(a) is at a "H" level.

It should be noted that the polygon clipping circuit 107 has to be operated with a cycle shorter than that of the received I and Q signals. That is because, as described below, the SELs 201 and 202 select signals fed back from the D-FF 205 while the clipping process is being performed. In the case of the hexadecagon clipping process, the polygon clipping circuit 107 has to be operated at a speed four times as high as those of the received I and Q signals. As described above, the clock signal has been set at a frequency four times as high as those of the received I and Q signals.

The square clipping circuit 203 applies the separate clipping process to each of the I and Q signals, which have been outputted respectively from the SELs 201 and 202, with the clip level RLx. As described above, the types of clip levels RLx vary depending on the types of clipping processes[processes]. In the case of the hexadecagon clipping process, four types of clip levels RLx are sequentially outputted from the clip level controlling unit 102. A clip level outputted in a period from a time t1 until a time t2 is RL1=RL. By this, the square clipping circuit 203 applies the clipping process to the I and Q signals, which have been outputted respectively from the SELs 201 and 202, with the clip level RL1.

Subsequently, the phase rotation circuit 204 rotates the respective phases of the I and Q signals, which the square clipping circuit 203 have performed the clipping process. In the period from the time t1 until the time t2, a coefficient A outputted from the coefficient A controlling unit 103 is $1.0 \times 2^8$, a control signal CTL1 outputted from the first reverse rotation controlling unit 105 is zero (normal rotation), and a control signal CTL2 outputted from the second reverse rotation controlling unit 106 is one (reverse rotation). By this, the phase rotation circuit 204 rotates the respective phases of the I and Q signals by $+\pi/4$.

The D-FF 205 fetches the I and Q signals, whose phases have been rotated by $+\pi/4$, in synchronism with the clock signal CLK at the following time t2, and feeds back the respective I and Q signals to the SELs 201 and 202. The SELs 201 and 202 select, and output, the I and Q signals, which have been fed back from the D-FF 205, at the time t2 when the control signal EN is at the "L" level.

The respective amplitudes of the I and Q signals, whose phases have been rotated by $+\pi/4$ by the phase rotation circuit 204, and which have been fed back from the D-FF 205, are $(2)^{1/2}$ times as large as those of the original signals which are received at the time t1. For this reason, the clip level controlling unit 102 outputs a clip level, which is $(2)^{1/2}$ times as large as the clip level RL1=RL at the time t1, or RL2=RL×$(2)^{1/2}$, in a period from the time t2 until a time t3. By this, the square clipping circuit 203 applies the clipping process to the I and Q signals, which have been fed back from the D-FF 205, with the clip level RL2.

In the period from the time t2 until the time t3, a coefficient A outputted from the coefficient A controlling unit 103 is $\{(2)^{1/2}-1\}\times 2^8$, a control signal CTL1 outputted from the first reverse rotation controlling unit 105 is one (reverse rotation), and a control signal CTL2 outputted from the second reverse rotation controlling unit 106 is zero (normal rotation). By this, the phase rotation circuit 204 rotates the respective phases of the I and Q signals, which the square clipping circuit 203 have performed the clipping process, by $-\pi/8$.

The D-FF 205 fetches the I and Q signals, whose phases have been rotated by $-\pi/8$, in synchronism with the clock signal CLK at the following time t3. The SELs 201 and 202 select, and output, the I and Q signals, which have been fed back from the D-FF 205, at the time t3 when the control signal EN is at the "L" level.

The respective amplitudes of the I and Q signals, whose phases have been rotated by $-\pi/8$ by the phase rotation circuit 204, and which have been fed back from the D-FF 205, are $2\times\{2-(2)^{1/2}\}^{1/2}$ times as large as those of the original signals which are received at the time t1. For this reason, the clip level controlling unit 102 outputs a clip level, which is $2\times\{2-(2)^{1/2}\}^{1/2}$ times as large as the clip level RL1=RL at the time t1, or RL3=RL×$2\times\{2-(2)^{1/2}\}^{1/2}$, in a period from the time t3 until a time t4. By this, the square clipping circuit 203 applies the clipping process to the I and Q signals, which have been fed back from the D-FF 205, with the clip level RL3.

In the period from the time t3 until the time t4, a coefficient A outputted from the coefficient A controlling unit 103 is $1.0\times 2^8$, a control signal CTL1 outputted from the first reverse rotation controlling unit 105 is one (reverse rotation), and a control signal CTL2 outputted from the second reverse rotation controlling unit 106 is zero (normal rotation). By this, the phase rotation circuit 204 rotates the phases respectively of the I and Q signals, which the square clipping circuit 203 have performed the clipping process, by $-\pi/4$.

The D-FF 205 fetches the I and Q signals, whose phases have been rotated by $-\pi/4$, in synchronism with the clock signal CLK at the following time t4. The SELs 201 and 202 select, and output, the I and Q signals, which have been fed back from the D-FF 205, at the time t4 when the control signal EN is at the "L" level.

The respective amplitudes of the I and Q signals, whose phases have been rotated by $-\pi/4$ by the phase rotation circuit 204, and which have been fed back from the D-FF 205, are $2\times(2)^{1/2}\times\{2-(2)^{1/2}\}^{1/2}$ times as large as those of the original signals which are received at the time 11. For this reason, the clip level controlling unit 102 outputs a clip level, which is $2\times(2)^{1/2}\times\{2-(2)^{1/2}\}^{1/2}$ times as large as the clip level RL1=RL at the time t1, or RL3=RL×$2\times 2^{1/2}\times\{2-(2)^{1/2}\}^{1/2}$, in a period from the time t4 until a time t5. By this, the square clipping circuit 203 applies the clipping process to the I and Q signals, which have been fed back from the D-FF 205, with the clip level RL4.

In the period from the time t4 until the time t5, a coefficient A outputted from the coefficient A controlling unit 103 is $\{(2)^{1/2}-1\}\times 2^8$, a control signal CTL1 outputted from the first reverse rotation controlling unit 105 is zero (normal rotation), and a control signal CTL2 outputted from the second reverse rotation controlling unit 106 is one (reverse rotation). By this, the phase rotation circuit 204 rotates the respective phases of the I and Q signals, which the square clipping circuit 203 have performed the clipping process, by $+\pi/8$.

The D-FF 205 fetches the I and Q signals, whose phases have been rotated by $+\pi/8$, in synchronism with the clock signal CLK at the following time t5. As described above, due to the square clipping process and phase rotation at the time t4, the respective phases of the I and Q signals are returned to the respective phases of the original signals which are received at the time t1. However, due to the work of the phase rotation circuit 204, the values on the respective amplitudes of the I and Q signals are increased. For this reason, the respective amplitudes of the I and Q signals are adjusted by the amplitude scaling circuit 206 and the amplitude reduction units 208 and 209 in order that the enlargement of the signal amplitudes stemming from the phase rotation can be offset. The D-FF 207 fetches the I and Q signals, which have been outputted from the amplitude reduction units 208 and 209, in synchronism with the control signal EN at the time t5. Thus, the output I and Q signals (#1 of FIG. 5(d)) as shown in FIG. 5(d) are outputted from the D-FF 207.

In addition, the time t5 is a time at which the next received I and Q signals (#2 of FIG. 5(d)) are received. The SELs 201 and 202 select the received I and Q signals in response to the control signal EN at the time t5 in the same manner as at the time t1. Thus, from the time t5 on, the same processes are repetitively performed as are performed from the aforementioned time t1.

Figure 6:
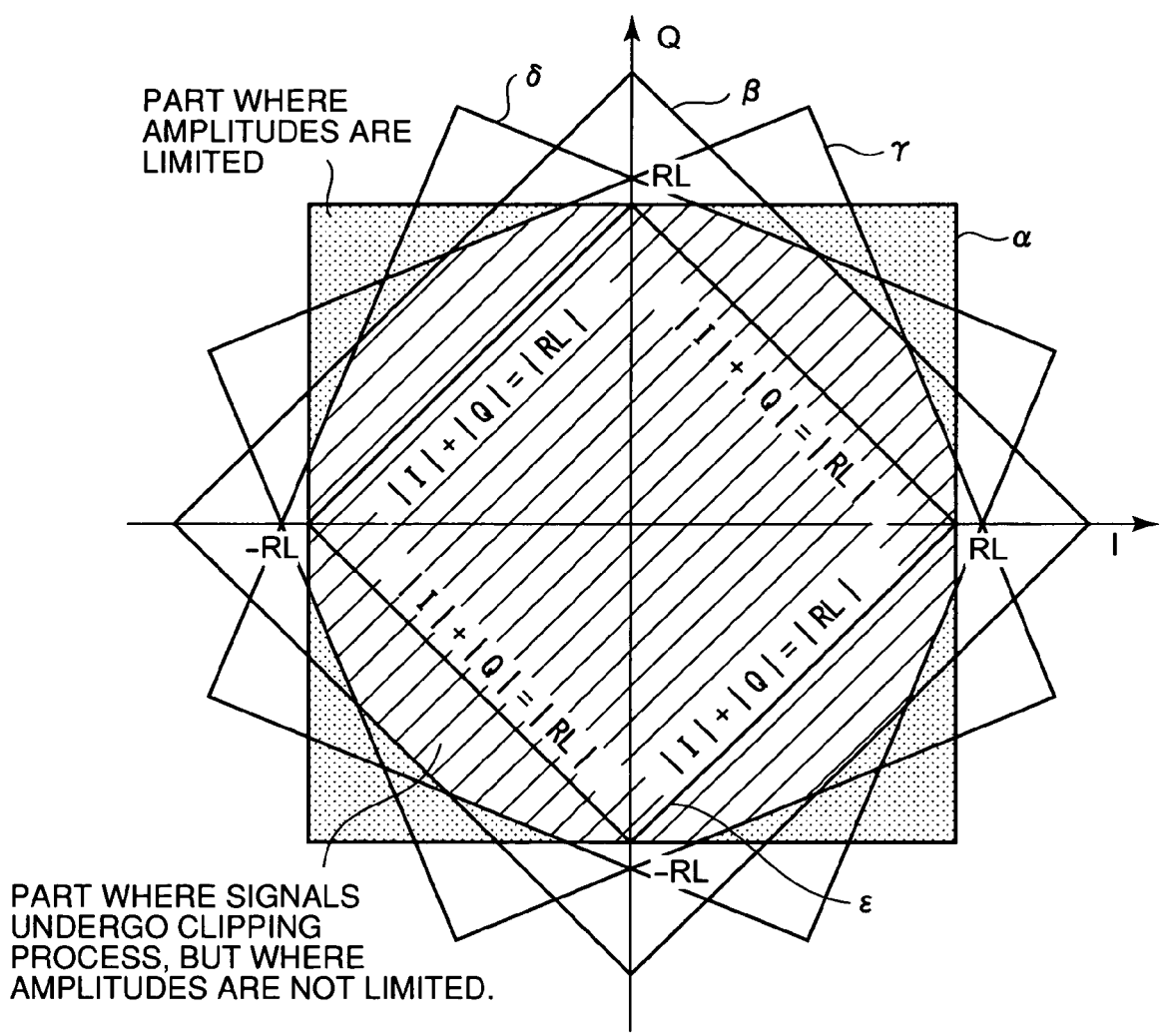
FIG. 6 is a diagram showing, on the two-dimensional axes of coordinates, a polygon clipping process performed by a polygon clipping circuit of FIG. 3.

FIG. 6 is a diagram showing, on the two-dimensional axes of coordinates, a polygon clipping process performed by the polygon clipping circuit 107 according to this exemplary embodiment. In FIG. 6, reference numeral α denotes a region where values on the amplitudes of the I and Q signals with no phase shift exist. Reference numeral β denotes a region where values on the amplitudes of the I and Q signals, which are processed by the clipping process after rotation of the phases of the I and Q signals by $+\pi/4$, exist. Reference numeral γ denotes a region where values on the amplitudes of the I and Q signals, which are processed by the clipping process after rotation of the phases of the I and Q signals by $-\pi/8$, exist. Reference numeral δ denotes a region where values on the amplitudes of the I and Q signals, which are performed the clipping process after rotation of the phases of the I and Q signals by $-\pi/4$, exist. Through these processes, the polygon clipping circuit 107 causes the I and Q signals to be processed by the clipping process in a hexadecagon indicated by diagonal lines.

On the other hand, in parallel with the process by the polygon clipping circuit 107, the received I and Q signals are inputted to the absolute value computation circuit 108. The absolute value computation circuit 108 computes the respective absolute values of the I and Q signals. The I/Q adder circuit 109 adds the absolute value |I| of the I signal to the absolute value |Q| of the Q signal, and outputs a result of the addition to the comparison circuit 110.

The comparison circuit 110 compares a signal |I|+|Q| outputted from the I/Q adder circuit 109 with the clip level RL in terms of largeness and smallness, and outputs a result of the comparison. The AND circuit 112 produces the logical multiplication of the comparison result signals outputted from the comparison circuit 110 and an instruction signal CTL3 from the controller 113 which indicates whether or not the clipping process is performed, and outputs a result of the logical multiplication. In response to a signal outputted from the AND 112, the SEL 111 chooses between the I and Q signals outputted from the polygon clipping circuit 107 as well as the I and Q signals outputted from the timing adjustment circuit 101.

The timing adjustment circuit 101 is a circuit configured as a buffer for dealing with a delay time which occurs between an input to the polygon clipping circuit 107 and an output from it. The timing adjustment circuit 101 is a circuit for delaying the I and Q signals in order that a timing when the I and Q signals which have passed through the polygon clipping circuit 107 are inputted to the SEL 111 and a timing when the I and Q signals which have passed through the timing adjustment circuit 101 are inputted to the SEL 111 can be matched. In addition, the AND 112 is provided for the purpose of turning on and off the clipping process, which is performed by the polygon clipping circuit 107, from the outside.

For example, in the case where the instruction signal CTL3 received from the controller 113 is zero (off), the signal outputted from the AND 112 is zero as well. In this case, the SEL 111 selects the I and Q signals which have been outputted from the timing adjustment circuit 101. On the other hand, in a case where the instruction signal CTL1 is one (on) and concurrently the comparison result signal from the comparison circuit 110 is also one (|I|+|Q| is larger than the clip level RL), the signal outputted from the AND circuit 112 is one. In this case, the SEL 111 selects the I and Q signals which have been outputted from the polygon clipping circuit 107. In addition, in a case where the instruction signal CTL3 is one and concurrently the comparison result signal from the comparison circuit 110 is zero (|I|+|Q| is not larger than the clip level RL), the signal outputted from the AND 112 is zero. In this case, the SEL 111 selects the I and Q signals which have been outputted from the timing adjustment circuit 101.

As a result, if the respective amplitudes of the received I and Q signals exist in a region denoted by ϵ, the I and Q signal which have passed through the timing adjustment circuit 101, which have not been processed by the clipping process, are selected. If the respective amplitudes of the received I and Q signals exist in a region beyond the region denoted by ϵ, the I and Q signal which have passed through the polygon clipping circuit 107 are selected. The reason why it is determined whether or not the clipping process should be performed on the basis of the clip level RL is that the application of the clipping process to the I and Q signals of such low levels that do not need power control is intended to be avoided.

As described above, in the case of this exemplary embodiment; the power clipping circuit is provided with the polygon clipping circuit 107 as well as the clip level controlling circuit 102, the coefficient A controlling unit 103, the coefficient B controlling unit 104, the first reverse rotation controlling unit 105 and the second reverse rotation controlling unit 106 which control the polygon clipping circuit 107. In addition, the feedback inside the polygon clipping circuit 107 and the switching of the clip levels and the control signals by those control unit are performed N/4 times for each cycle of the I and Q signals. As a result, it suffices that the polygon clipping circuit 107 includes one square clipping circuit and one phase rotation circuit only. Accordingly, this makes it possible to realize the polygon clipping process with a circuit size smaller than that of conventional power clipping circuits. Moreover, in the case of this exemplary embodiment, change in the clip levels RLx, the coefficients A and B, and the control signals CTL1 and CTL1 as well as change in the number of times when the feedback is performed makes it possible to easily realize various clipping processes ranging from the square clipping process to the quasi-circle clipping process without modifying the circuit configuration in response to conditions and intended use.

The present invention can be applied to a baseband signal unit in a base station in the W-CDMA radio communications system.

While this invention has been particularly shown and described with reference to exemplary embodiments thereof, it will be understood by those skilled in the art that various changes in form and details may be made therein without departing from the spirit and scope of the invention as defined by the appended claims. The above-described exemplary embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. A power clipping circuit comprising:
    a selector which receives a baseband signal, and selects one of said baseband signal or a feed back signal, and outputs a selected signal;
    a square clipping circuit which receives said selected signal, and limits an amplitude of said selected signal, and outputs a clipped signal;
    a phase rotation circuit which receives said clipped signal, and rotates a phase of said clipped signal, and outputs a phase rotated signal to said selector as said feed back signal;
    an amplitude scaling circuit which receives said phase rotated signal, adjusts said phase rotated signal to compensate for an amplitude difference between said phase rotated signal and said clipped signal, and sends amplitude scaled signal;
    a controlling circuit which controls said selector, said square clipping circuit, said phase rotation circuit and said amplitude scaling circuit.

2. The power clipping circuit according to claim 1, wherein said selector selects said baseband signal for one time of every N/4 times ($N=2^{(n+2)}$: $n=0, 1, 2, \ldots$), and selects said feed back signal for other times of every N/4 times.

3. The power clipping circuit according to claim 2, wherein said selecting operation of said selector, said clipping operation of said square clipping circuit, said rotation operation of said phase rotation circuit and said adjusting operation of said amplitude scaling circuit are performed N/4 times for one period of said baseband signal.

4. The power clipping circuit according to claim 3, said selector further comprising:
    a first selector which receives a common-mode signal of said baseband signal;
    a second selector which receives an orthogonal signal of said baseband signal.

5. The power clipping circuit according to claim 2, wherein an amount of clipping of said selected signal is determined in response to an amplitude change during said rotation operation in said phase rotation circuit.

6. The power clipping circuit according to claim 1, further comprising:
    a timing adjustment circuit which receives said baseband signal, adjusts the time delay, and outputs said adjusted baseband signal;
    a comparison circuit which receives said baseband signal, compares said baseband signal with a predetermined threshold and outputs a result of said comparison process;
    a third selector which receives said adjusted baseband signal and said amplitude scaled signal, and selects and outputs one of said adjusted baseband signal and said amplitude scaled signal based on said result of said comparison process.

7. The power clipping circuit according to claim 1, wherein said power clipping circuit is a hexadecagon clipping circuit.

8. The power clipping circuit according to claim 1, wherein said power clipping circuit is a triacontakaidigon clipping circuit.

9. A power clipping method comprising:
    selecting one of a baseband signal and a feed back signal;
    clipping an amplitude of said selected signal;
    rotating a phase of said clipped signal; and
    adjusting said phase rotated signal to compensate for an amplitude difference between said phase rotated signal and said clipped signal;
    wherein said selecting, clipping, and rotating are each performed more than once.

10. The power clipping method according to claim 9, wherein during said selecting operation, said baseband signal is selected for one time of every N/4 times ($N=2^{(n+2)}$: $n=0, 1, 2, \ldots$), and said feed back signal is selected for other times of every N/4 times 11. The power clipping method according to claim 10, wherein said selecting operation, said clipping operation, said rotation operation and said adjusting operation are performed N/4 times for one period of said baseband signal.

12. The power clipping method according to claim 10, wherein an amount of clipping of said selected signal is determined in response to an amplitude change during said rotation operation.

13. The power clipping method according to claim 7, further comprising:
    delaying said baseband signal;
    comparing said baseband signal with a predetermined threshold;
    selecting one of said adjusted signal and said delayed signal based on a result of the comparison.

14. The power clipping method according to claim 7, wherein said baseband signal is hexadecagon clipped.

15. The power clipping method according to claim 7, wherein said baseband signal is triacontakaidigon clipped.

* * * * *